(12) United States Patent
Effey et al.

(10) Patent No.: US 12,364,206 B2
(45) Date of Patent: Jul. 22, 2025

(54) METHOD FOR TREATING PLANTS

(71) Applicant: crop.zone GmbH, Aachen (DE)

(72) Inventors: Fabian Effey, Aachen (DE); Ronny Galonska, Aachen (DE); Achim Andres, Aachen (DE); Peter Frings, Aachen (DE); Matthias Eberius, Aachen (DE)

(73) Assignee: crop.zone GmbH, Aachen (DE)

( * ) Notice: Subject to any disclaimer, the term of this patent is extended or adjusted under 35 U.S.C. 154(b) by 214 days.

(21) Appl. No.: 18/024,915

(22) PCT Filed: Sep. 3, 2021

(86) PCT No.: PCT/EP2021/074374
§ 371 (c)(1),
(2) Date: Mar. 6, 2023

(87) PCT Pub. No.: WO2022/053402
PCT Pub. Date: Mar. 17, 2022

(65) Prior Publication Data
US 2023/0329153 A1    Oct. 19, 2023

(30) Foreign Application Priority Data

Sep. 8, 2020 (DE) .......................... 102020123425.2
Jun. 8, 2021 (DE) .......................... 102021114692.5

(51) Int. Cl.
*A01G 7/04*    (2006.01)
*A01M 21/04*    (2006.01)

(52) U.S. Cl.
CPC ............. *A01G 7/04* (2013.01); *A01M 21/046* (2013.01)

(58) Field of Classification Search
CPC ............................... A01G 7/04; A01M 21/046
See application file for complete search history.

(56) References Cited

U.S. PATENT DOCUMENTS 2,592,654 A    4/1952 Canfield et al. ................. 43/132
4,094,095 A *  6/1978 Dykes ................. A01M 21/046
47/1.3

(Continued)

FOREIGN PATENT DOCUMENTS

DE    102020123425.2    9/2020
DE    102021114692.5    6/2021

(Continued)

OTHER PUBLICATIONS

International Search Report dated Dec. 17, 2021 from the European Patent Office in the related PCT application PCT/EP2021/074374 citing references A-F above and an English translation of the Int'l Search Report (7 pages).

(Continued)

*Primary Examiner* — Joshua D Huson
*Assistant Examiner* — Edgar Reyes
(74) *Attorney, Agent, or Firm* — Imperium Patent Works; Darien K. Wallace

(57) ABSTRACT

The invention relates to a method for treating plants, comprising: (S100) connecting a first, in particular substantially stationarily arranged applicator, which has a first polarity, a second, in particular substantially stationarily arranged applicator, which has a second polarity, and a third, in particular substantially stationarily arranged applicator, which has the first polarity, of at least one applicator unit to a controlled constant-power source, (S200) bringing the first applicator and the second applicator into contact with a plant stem and/or leaves of a plant, and the second applicator and the third applicator into contact with the plant stem and/or the leaves of the plant, in succession and/or at the same time, in particular without the applicators making contact with the ground, (S300) applying electrical direct current to the contacted plant stem and/or the leaves of the plant, and (Continued)

(S400) maintaining a substantially constant electrical power by using the controlled constant-power source.

19 Claims, 10 Drawing Sheets

(56) References Cited

U.S. PATENT DOCUMENTS

| | | | | |
|---|---|---|---|---|
| 4,177,603 A * | 12/1979 | Dykes | ................ | A01M 21/046 47/1.3 |
| 4,428,150 A * | 1/1984 | Geiersbach | ......... | A01M 21/046 47/1.3 |
| 11,122,792 B2 * | 9/2021 | Diprose | ............. | A01M 21/046 |
| 2006/0265946 A1 | 11/2006 | Schwager et al. | .... | A01M 21/04 47/1.3 |
| 2016/0050902 A1 * | 2/2016 | Crisp | .................... | A01M 19/00 43/124 |
| 2019/0320641 A1 | 10/2019 | Rona et al. | .......... | A01M 21/04 |
| 2019/0373816 A1 | 12/2019 | Eberius et al. | ......... | A01G 7/04 |
| 2020/0107539 A1 * | 4/2020 | Brodie | ..................... | A61L 2/12 |
| 2020/0205395 A1 | 7/2020 | De Andrade | ......... | A01M 21/04 |
| 2022/0295684 A1 * | 9/2022 | Bettiol | ................ | A01M 21/046 |
| 2023/0098648 A1 * | 3/2023 | Barel | ..................... | A01M 19/00 |
| 2023/0232811 A1 * | 7/2023 | Einat | ........................ | H05B 6/80 43/132.1 |
| 2023/0270036 A1 * | 8/2023 | Groffils | ............... | A01M 21/046 47/1.3 |
| 2023/0309444 A1 * | 10/2023 | Cordeiro | ................ | A01D 34/01 56/1 |

FOREIGN PATENT DOCUMENTS

| | | |
|---|---|---|
| WO | WO 2018/095450 A1 | 11/2017 |
| WO | WO2019/052591 A1 | 9/2018 |

OTHER PUBLICATIONS

Office action of the German Patent Office in the related German patent application DE102021114692.5 dated Aug. 2, 2023 citing reference A (6 pages).

\* cited by examiner ial Stage entry under 35
METHOD FOR TREATING PLANTS

CROSS REFERENCE TO RELATED APPLICATION

This application is a U.S. National Stage entry under 35 U.S.C. § 371 based on International Application No. PCT/EP2021/074374, filed on Sep. 3, 2021, which was published under PCT Article 21(2) and which claims priority from German Application No. 102020123425.2, filed on Sep. 8, 2020 and from German Application No. 102021114692.5, filed on Jun. 8, 2021. The disclosure of each of the foregoing documents is incorporated herein by reference.

TECHNICAL FIELD

The invention relates to a method for treating plants, in particular for the desiccation of field crops or for green manure control.

BACKGROUND

Desiccation (translated: dry-down) is understood here to mean a procedure in agriculture, in which crop plants are killed with desiccation agents for the purpose of accelerating ripening. A welcome side effect is the simultaneous killing of weeds, the still green plant parts of which would otherwise be harvested, for example, with cereals and would increase the moisture content of the crop.

Field crops are crops that are grown in fields. Field crops include cereals, root crops and legumes, oil crops or plants for green harvesting, which are used as animal feed or, like silage maize, for energy production.

Green manuring is the targeted cultivation of plants for soil improvement in arable farming, fruit growing, viticulture and horticulture. Unlike crops, the plants are usually not harvested, but mulched or plowed under.

If electrical current flows through plant parts, they are damaged as a function of electrical current strength, electrical voltage, current type (direct current, alternating current, frequency, degree of smoothing or residual ripple, etc.). A comprehensive and uniform theory of the effect has not been present until now. It can be safely assumed that in particular the conductive bundles for transporting liquid in the plant, being the parts with the lowest electrical resistance, are damaged in such a manner that they become non-functional and the plant subsequently dies and withers, depending on the degree of damage and the weather conditions.

The use of electrical direct current for treating plants is known, for example, from U.S. Pat. No. 2,007,383 and WO 2019/052591 A1, while the use of electrical direct current or alternating current is known, for example, from WO 2018/095450 A1 or WO 2018/050142 A1.

Traditionally, two metallic applicators are used when applying electric current, to at least keep the electrical resistance at the contact point as low as possible. Furthermore, in some cases the circuit is closed not by a second contact on plants with the opposite pole, but by electrodes cutting into the soil.

Such applicators are also referred to as long applicators (long range applicators, also tongue applicators or LRBs ("Long Range Blade"). Such applicators have a distance of 0.8-1 m.

The use of high electric voltages also requires wide distances and barriers for work safety reasons (especially when metallic conductors are present in the work area, such as in a vineyard or in urban applications). Such devices are therefore expensive due to elaborate insulation and disadvantageously large due to increased clearance requirements for creepage and air distances. The technical and economic applicability is therefore low.

Until now, lamellar applicator pairs made of elastic spring steel were common, each arranged in two rows one behind the other to make electrical contact with the plants. The two applicators of an applicator pair have different polarity and conduct electrical current through plant, soil and mostly again through the plants. Since the applicators are elastic and adapt individually to uneven ground, they should have a corresponding minimum distance depending on the degree of freedom of movement, in order to prevent direct applicator contacts or electric arcs.

At the same time, however, this also creates long conduction paths with considerable ohmic resistances and high current consumption when flowing through long plant parts and the soil and long current paths through the soil.

There is therefore a need to identify manners in which improvements can be made here.

SUMMARY

The object of the invention is achieved by a method comprising the steps of:
  connecting a first, in particular substantially stationarily arranged applicator, which has a first polarity, a second, in particular substantially stationarily arranged applicator, which has a second polarity, and a third, in particular substantially stationarily arranged applicator, which has the first polarity, of at least one applicator unit to a controlled constant-power source,
  bringing into contact, in particular without the applicators making contact with the ground, the first applicator and the second applicator with a plant stem and/or leaves of a plant, and the second applicator and the third applicator into contact with the plant stem and/or the leaves of the plant, in succession and/or at the same time,
  applying electrical direct current to the contacted plant stem and/or the leaves of the plant, and
  maintaining a substantially constant electrical power by means of the controlled constant-power source.

Electric direct current is understood to mean an electrical current free from a polarity change or change in current direction. However, the current strength can change, i.e., the electrical direct current can also be a pulsating direct current, such as a direct current, which has been obtained by rectifying an alternating electrical current or three-phase current and has a residual ripple.

By virtue of the fact that an applicator unit with at least three applicators and an alternating polarity sequence for applying electrical direct current to the plant stem and/or the leaves of the plant is used, a particularly efficient treatment of plants, in particular for the desiccation of crops or for green manure control, can surprisingly be achieved with reduced energy consumption.

The use of electrical direct current also allows a further reduction in the respective distance between directly adjacent applicator units, since phase shifts of the electric current, like in the case of the use of electrical alternating current, between adjacent applicator units cannot occur.

In this case, substantially stationary is understood to mean that although slight movements of the applicators are possible, a distance for example, between the first applicator and the second applicator and a distance between the second applicator and the third applicator, changes however only slightly, for example by 3%, 5% or also 10% of the value of the respective distance.

The plant stem and/or leaves of the plant can be regarded as an ohmic load, which is switched on by bringing into contact, while a no-load situation is produced by a bringing-out-of-contact. These load fluctuations are substantially compensated or adjusted during operation in which a device with the applicator unit is moved over a field with plants in the direction of movement. In this case, a substantially constant electrical power is understood to mean that power regulation compensates for power fluctuations within a predetermined time in order to return to a predetermined target power.

Thus, by these measures, the energy efficiency of the method for treating plants, in particular for desiccation of crops or for green manure control, can be increased.

In accordance with one embodiment, a first applicator unit is used, in which the first applicator, the second applicator and the third applicator are arranged transversely to a direction of movement of the applicator unit in succession at a distance from one another. In other words, when a device with the applicator unit is moved over a field with plants, first the first applicator, then the second applicator and finally the third applicator pass over a reference point on the ground in succession. Thus, with an applicator unit having three applicators with a particularly simple design, a particularly large surface can be applied with electric direct current.

In accordance with a further embodiment, a second applicator unit is used in which a first applicator, a second applicator and a third applicator are arranged spaced apart from one another along a direction of movement of the second applicator unit. In other words, when the second applicator unit is moved in the direction of movement over a field with plants, the first applicator and/or the second applicator and/or the third applicator simultaneously traverse a reference axis on the ground.

In accordance with a further embodiment, such a first applicator unit and such a second applicator unit are used, wherein the first applicator unit applies electrical direct current to a plant stem and/or leaves of a plant for a first period of time, wherein the second applicator unit applies electrical direct current to a plant stem and/or the leaves of the plant for a second period of time, wherein the second period of time is longer than the first period of time when the plant stem and/or leaves of the plant extend substantially in a transverse direction to the direction of movement, and wherein the second period of time is shorter than the first period of time when the plant stem and/or leaves of the plant extend substantially in a longitudinal direction to the direction of movement. In other words, two applicator units are used in operation, wherein the second applicator unit is used to apply direct electric current to plants which, due to their dimensions, can only be applied with direct electric current by the first applicator unit for a short time at best, e.g., because their dimensions in their longitudinal direction in the direction of movement are too small to contact at least two of the three applicators of the first applicator unit simultaneously for a sufficient period of time. Thus, also plants with irregular growth can be supplied reliably with electrical direct current.

In accordance with a further embodiment, an electrical field strength is provided between the first applicator and the second applicator, which is greater than the electrical field strength provided between the second applicator and the third applicator. For this purpose, a distance between the first applicator and the second applicator, in particular of the first applicator unit, is smaller than a distance between the second applicator and the third applicator. Surprisingly, it has been found that with such an arrangement, the tendency for arcing between the first applicator and the second applicator can be reduced when the first applicator is a leading applicator with a positive polarity and the second applicator is a trailing applicator with a negative polarity. In other words, this combination of polarities reduces arcing between the first applicator and the second applicator. Conversely, arcing between the second applicator and the third applicator is increased when the second applicator is applied with the negative polarity and the third applicator is applied with the positive polarity. This is counteracted by an increased distance which leads to a reduced electrical field strength.

In accordance with a further embodiment, a substantially equal electrical field strength is provided between the first applicator and the second applicator and between the second applicator and the third applicator, in particular if the first applicator, the second applicator, and the third applicator simultaneously contact the plant stem and/or the leaves of the plant. In this case, a substantially identical electrical field strength is understood to mean that it can vary, for example, due to production tolerances, for example by 3%, 5% or also 10%. For this purpose, a distance between the first applicator and the second applicator, in particular of the second applicator unit, can be the same as the distance between the second applicator and the third applicator.

In accordance with a further embodiment, applicators with a continuously formed outer surface are used. A continuous outer surface is understood to mean a surface without edges, protrusions or similar surface discontinuities. Thus, field strength peaks of the electrical field strength can be avoided and a homogenization of the field strength profile can be achieved overall, which also leads to a reduction in arcing.

In accordance with a further embodiment, a constant-power source is used which provides an electrical direct current with a ripple of 5% to 20%. In this case, ripple, also residual ripple, is understood to mean an undesired AC voltage component despite smoothing by at least one smoothing capacitor. The residual ripple can be load-dependent, i.e., a high load leads to a low residual ripple, while a small load leads to a high residual ripple. In other words, an electrical direct current is used, which is not constant in time, but in which the current direction reversal or a polarity change as in the case of an electrical alternating current does not occur.

Further, the invention relates to a device for treating plants, an applicator unit for such a device, a carrier vehicle with such a device and a kit containing components of such a device.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1A:
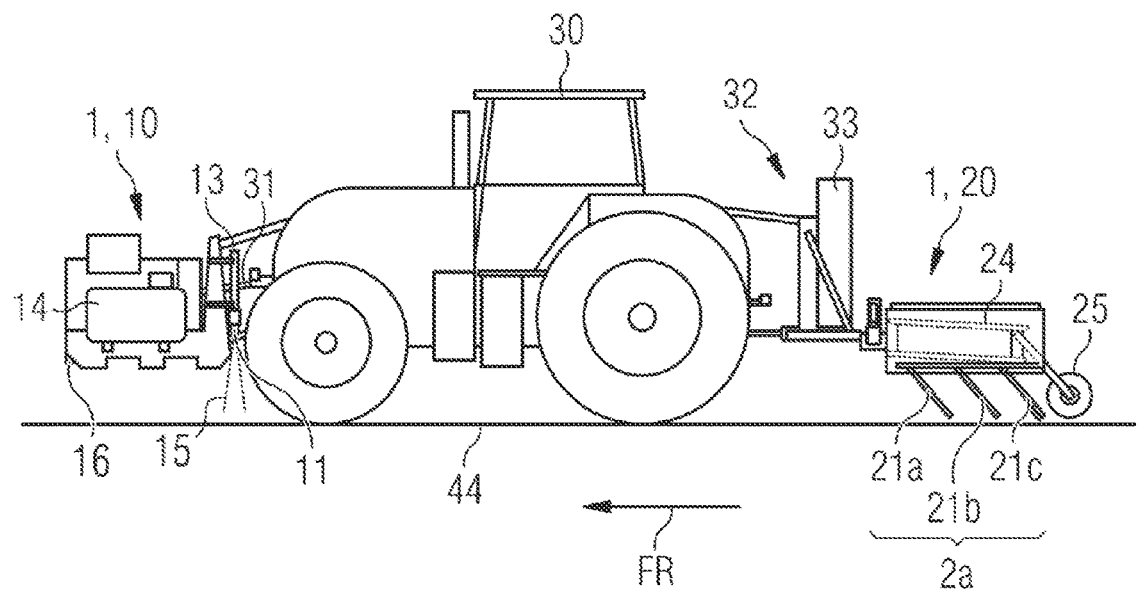
FIGS. 1A and 1B show an embodiment of a carrier vehicle of a device for treating plants.

FIG. 1A shows an arrangement of the individual components of the device 1 in accordance with the invention on an agricultural machine serving as a carrier vehicle 30.

By means of the device 1, for example, a desiccation can be brought about by applying electric current to plants. In this case, provision can be made for electrical contact resistances to be reduced by prior application of a medium that reduces contact resistance, such as for example a corresponding liquid, before the application of electric current.

Agricultural machines are specialized machines which are used predominantly in agriculture. They can be designed to be self-propelled or be drawn by an agricultural tractor vehicle, such as a tractor. In other words, the agricultural machine can be a tractor vehicle with its own drive or a trailer without its own drive, which is pulled by a tractor vehicle.

In the present exemplary embodiment, the carrier vehicle 30 is designed as a tractor. In deviation from the present exemplary embodiment, the carrier vehicle 30 can also be designed as a fertilizer, seed or harvesting machine, which has been modified by attaching the components of the device 1. For this purpose, the components of the device 1 can also be provided in the form of a kit.

The device 1 and the carrier vehicle 30 may vary depending on the mode of use and specific requirements of the crop in question and the time of treatment.

In the present exemplary embodiment, the device 1 has a first module 10 for applying a contact resistance-reducing medium 15 and a second module 20 for transmitting electrical direct current to the plant parts. In deviation from the present exemplary embodiment, however, the device 1 can also have only a second module 20 for transmitting electric current to the plant parts. Further, it can be provided that, for example, in the case of a towing/trailing vehicle combination, consisting of a tractor and a trailer pulled by the tractor, the first module 10 is assigned to the tractor vehicle and components of the second module 20 to the trailer. The components of the second module 20 can also be assigned only to the trailer.

In this exemplary embodiment, the contact resistance-reducing medium 15 is a contact resistance-reducing liquid.

In the present exemplary embodiment, the first module 10 is arranged on the front side and the second module 20 is arranged on the rear side of the carrier vehicle 30. This arrangement makes it possible for the application of the contact resistance-reducing medium 15 to always take place before or simultaneously with the electrophysical treatment by applying electrical direct current.

The first module 10 has at least one application device designed as a nozzle 11. In combination with the nozzle 11, the application device can also comprise a wiper (not shown) or alternatively be itself designed as a wiper. The application device is thus designed for spraying and wiping or applying the contact resistance-reducing liquid 15, or alternatively for spraying or wiping. The first module 10 thereby has a number of jointly or preferably individually controllable nozzles 11 or wipers, which are arranged on a first support structure 13 in a desired working width of the device 1 (e.g., 1.5-48 m, preferably 6-27 m) and geometry (statically or flexibly mounted or sensor-controlled in height). The nozzles 11 and/or wipers are supplied with the contact resistance-reducing medium 15, in the present exemplary embodiment a liquid, which is stored in one or more liquid containers 14. Sensors 16 are located in the area of the nozzles 11, among others (not shown), the data from which is used to control the application amount of the contact resistance-reducing medium 15 as required. Additional sensors 16 may be located at the front of the first module 10 (i.e., in the direction of travel) for the purpose of occupational safety. Sensors used include, but are not limited to, current/voltage sensors, optical sensors such as camera systems, position or movement sensors, LIDAR, metal detectors, and others. Drones flying ahead can also be used to detect plants ahead. Furthermore, pasture fence applicators for deterring or startling animals may be disposed on the carrier vehicle 30 or the second module 20.

In the present exemplary embodiment, the carrier vehicle 30 provides mechanical drive power via a power-take-off (PTO) shaft 31 or hydraulic circuit to an electrical generator 32 of the second module 20, which may be located in the rear area (as shown) or front area on the carrier vehicle 30. The individual modules of the device 1 are arranged as attachments, for example, with three-point suspensions. Special crops require special machines, partly already as carrier vehicle 30 with special suspensions, if necessary also laterally or under the carrier vehicle 30. In the case of devices 1 with very high power requirements due to, for example, very high working widths or carrier vehicles 30 without sufficient free power capacity, independent power generator systems can also be used, which can be coupled onto the carrier vehicle 30, semi-mounted or moved on a trailer.

Electrical current is conducted from the generator 32 to electrical lines to a transformation and control unit 33 of the second module 20. There, the electric current is converted for transformation and then brought to the desired ultimately used frequency, waveform and electric voltage in centrally or distributedly positioned transformers and further control units in the case of alternating current and to the predetermined electric voltage with a predetermined residual ripple in the case of direct current.

The second module 20 has a plurality of applicator units 2a each having a plurality of applicators 21a, 21b, 21c for applying electrical direct current to plants.

Figure 1B:
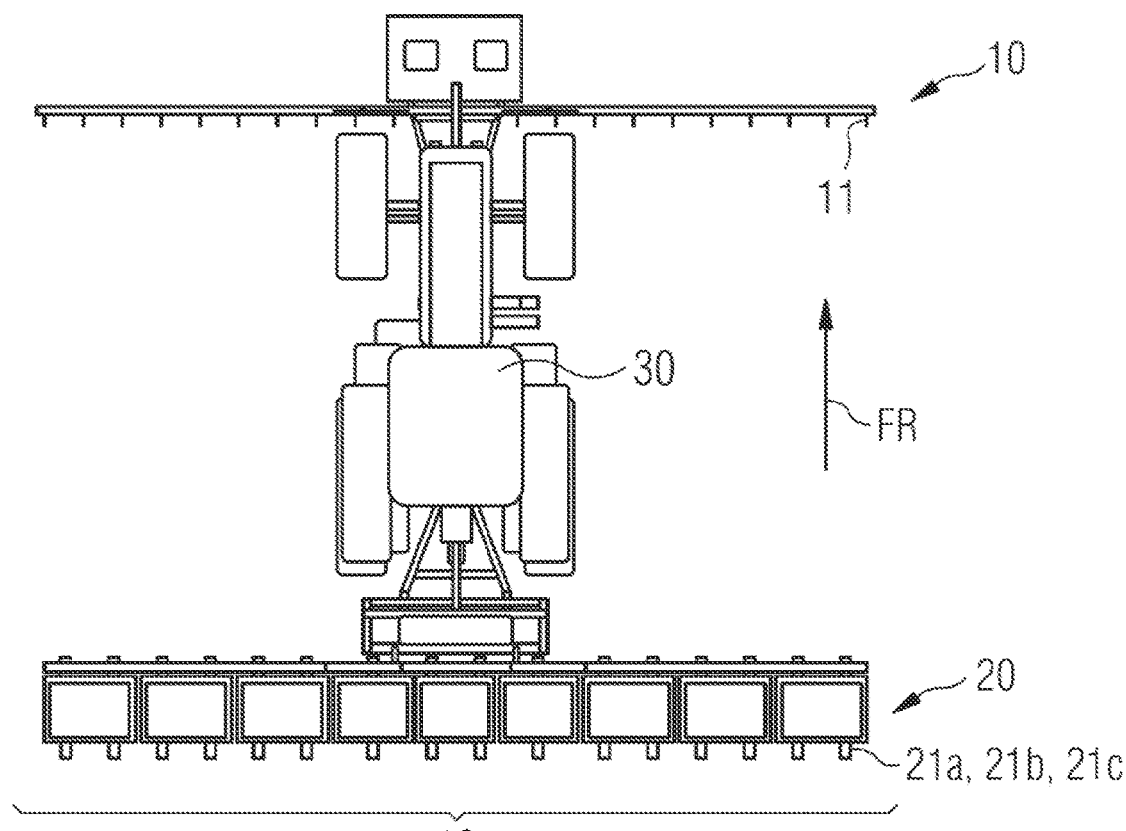

Additionally, reference is now made to FIG. 1B.

The plurality of applicator units 2a are arranged in an applicator row 12, wherein the direction of extension of the applicator row 12 extends transversely, in the present exemplary embodiment at an angle of 90°, to a direction of movement FR of the carrier vehicle 30. The applicators 21a, 21b, 21c of the applicator row 12 are arranged on a parallelogram-like second support structure 24, which can be height-positioned via a trailing auxiliary wheel (support wheel) 25 (depending on the crop, it can also be leading).

Figure 2:
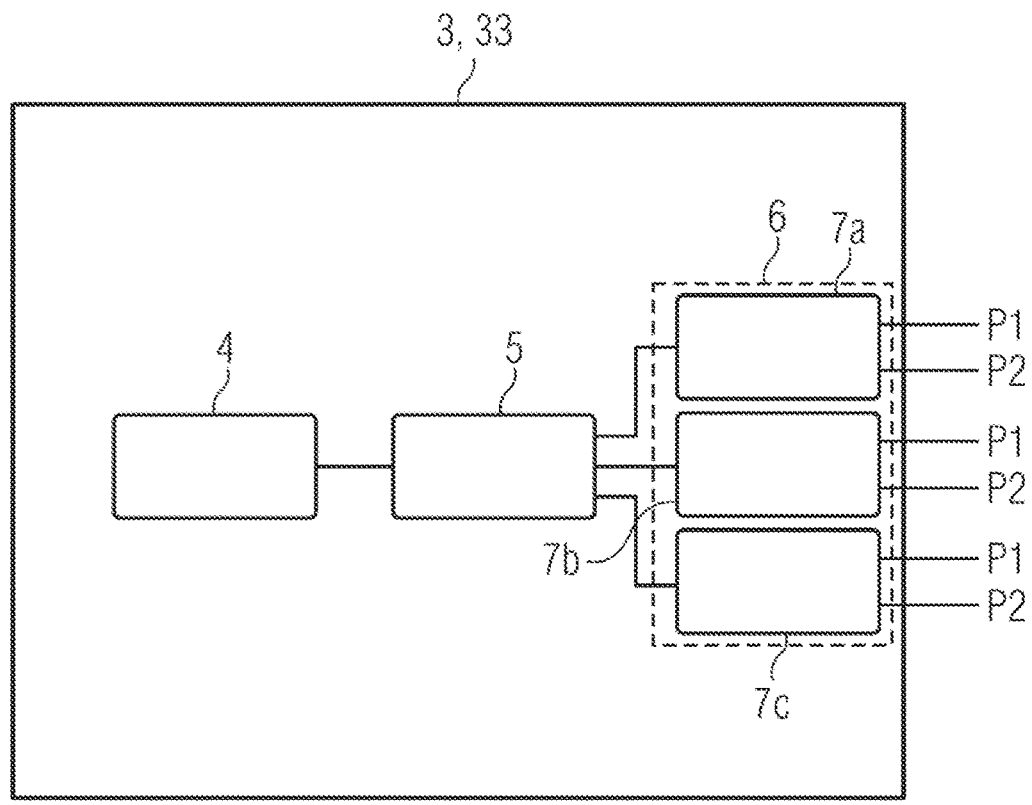
FIG. 2 shows components of a transformation and control unit of the device shown in FIGS. 1A and 1B.

Additionally, reference is now made to FIG. 2.

Details of a constant-power source 3 of the transformation and control unit 33 are shown.

In the present exemplary embodiment, the constant-power source 3 has a connection for lines 4 for electrically conductively connecting to the generator 32, a distribution unit 5 and a converter assembly 6 with a plurality of converters 7a, 7b, 7c. In this context, a converter (also referred to as an AC converter or AC/DC converter) is understood to be a power converter that generates an AC electrical voltage with a different frequency and amplitude from an AC electrical voltage.

In FIG. 2, three converters 7a, 7b, 7c are shown for the converter of the present exemplary embodiment 20 (10). However, the number of converters 7a, 7b, 7c can also be a different one.

Each of the applicator units 2a, 2b of the applicator row 12 can each be assigned a converter 7a, 7b, 7c, i.e., each of the applicator units 2a, 2b of the applicator row 12 has its own converter 7a, 7b, 7c.

In the present exemplary embodiment, the generator 32 provides electrical three-phase current with an electrical voltage of 400V with a frequency of 50 Hz to 60 Hz. The distribution unit 5 distributes the electrical three-phase current to the plurality of converters 7a, 7b, 7c.

After conversion by the converters 7a, 7b, 7c as well as rectification with rectifiers (not shown) and subsequent smoothing with smoothing capacitors (also not shown), an electrical DC voltage of 1600V to 5500V with a maximum residual ripple of 5% to 20% (in the frequency range 60 kHz to 100 kHz) is provided in each case. Thus, each of the plurality of inverters 7a, 7b, 7c provides at a first output a first polarity P1, in the present exemplary embodiment, a positive polarity, and at its second output a second polarity P2, in the present exemplary embodiment, a negative polarity.

In the present exemplary embodiment, power control is carried out by a combined frequency and pulse width modulation.

Figure 3:
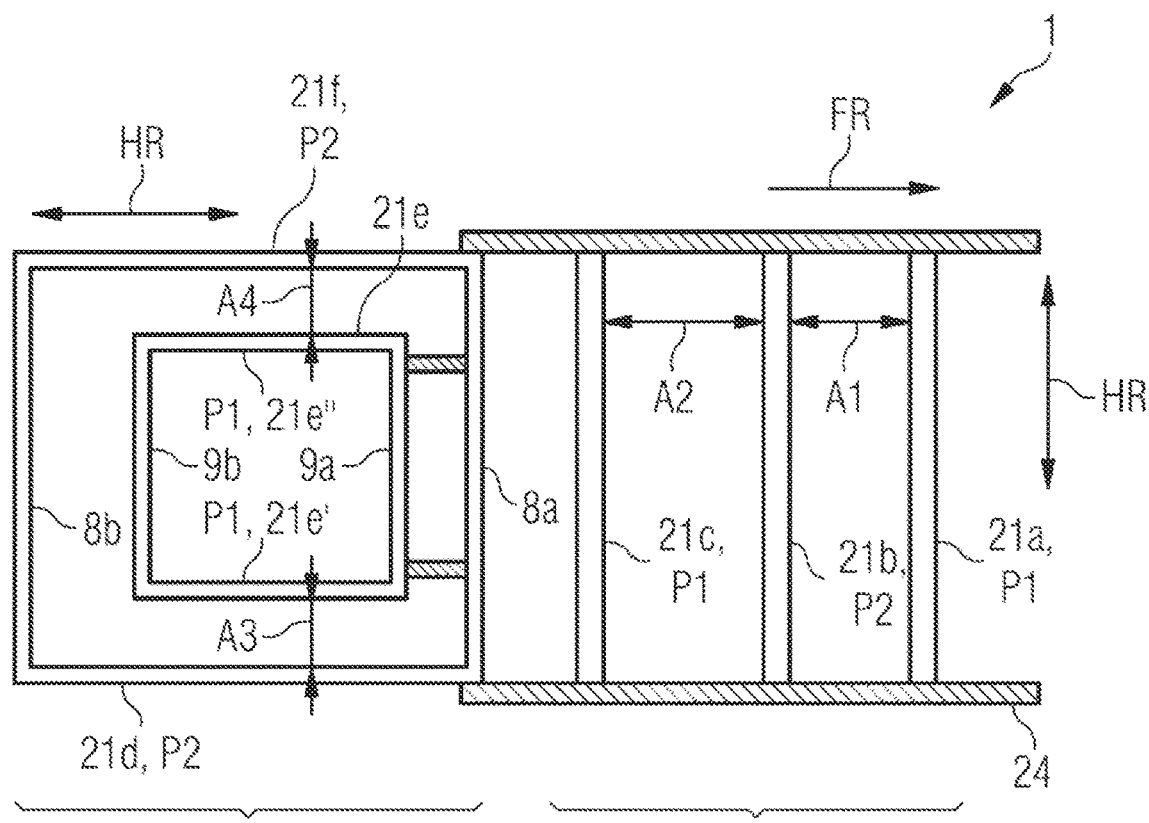
FIG. 3 shows an applicator unit in accordance with a first exemplary embodiment for the device shown in FIGS. 1A and 1B.

Additionally, reference is now made to FIG. 3 to explain further details of the device 1 in accordance with an exemplary embodiment.

In the present exemplary embodiment, the device 1 has a first applicator unit 2a and a second applicator unit 2b for applying electrical direct current to plants.

The first applicator unit 2a has a first in particular substantially stationarily arranged applicator 21a, a second in particular substantially stationarily arranged applicator 21b, and a third in particular substantially stationarily arranged applicator 21c, which are each fastened to the second support structure 24.

In this case, substantially stationary is understood to mean that although slight movements of the applicators 21a, 21b, 21c are possible, however, a distance A1 between the first applicator 21a and the second applicator 21b and a distance A2 between the second applicator 21b and the third applicator 21c, for example, changes only slightly, for example by 3%, 5% or also 10% of the value of the distance A1 or of the value of the distance A2.

In the present exemplary embodiment, the first applicator 21a, the second applicator 21b and the third applicator 21c are arranged in succession at a distance from one another in the direction of the direction of movement FR of the applicator unit 2a with the distance A1 or the distance A2 from one another.

Further, in the present exemplary embodiment, the first applicator 21a, the second applicator 21b and the third applicator 21c are each formed rod-shaped with a main extension direction HR, which in the present exemplary embodiment extends in a straight line at right angles to the direction of movement FR.

In other words, the first applicator 21a and the third applicator 21c can also be regarded as outer applicators and the second applicator 21b can be regarded as an inner applicator, wherein the outer applicators each have the same polarity P1 and the inner applicator has the other polarity P2.

In the present exemplary embodiment, the first applicator 21a, the second applicator 21b and the third applicator 21c are each designed as round rods made of an electrical conductor material. Thus, the first applicator 21a, the second applicator 21b and the third applicator 21c each have a continuously formed outer surface without edges, protrusions or similar surface discontinuities.

The distance A1 between the first applicator 21a and the second applicator 21b as well as the distance A2 between the second applicator 21b and the third applicator 21c can be in the range of 1.5 m to 0.15 m. In the present exemplary embodiment, it is in the range from 15 cm to 20 cm. Such applicators are also referred to as short applicators (SRA, Short Range Blade). In this embodiment, the distance A1 and the distance A2 are not equal. In the present exemplary embodiment, the distance A1 is smaller than the distance A2. In the present exemplary embodiment, the distance A1 is 15 cm and the distance A2 is 20 cm.

Because the distance A1 in the present exemplary embodiment is smaller than the distance A2, and thus the respective electrical field strength between the first applicator 21a and the second applicator 21b is greater than between the second applicator 21b and the third applicator 21c, in the present exemplary embodiment an arcing between the second applicator 21b and the third applicator 21c is reduced, in particular if the second applicator 21b is applied with the negative polarity and the third applicator 21c is applied with the positive polarity. This is counteracted by the larger distance A2 compared to the distance A1, which leads to a reduced electrical field strength in comparison.

The second applicator unit 2b also has a first in particular substantially stationarily arranged applicator 21d, a second in particular substantially stationarily arranged applicator 21e, and a third in particular substantially stationarily arranged applicator 21f.

In the present exemplary embodiment, the first applicator 21d and the third applicator 21f are each formed rod-shaped with a main extension direction HR, which in the present exemplary embodiment extends longitudinally along the direction of movement FR, i.e., the first applicator 21d and the third applicator 21f in the present exemplary embodiment are arranged at a right angle spaced apart from one another longitudinally along the direction of movement FR. In this case, the first applicator 21d, the second applicator 21e and the third applicator 21f are in each case also designed as round rods of an electrical conductor material in the present exemplary embodiment.

In the present exemplary embodiment, the first applicator 21d and the third applicator 21f are connected to one another by two connecting sections 8a, 8b.

The two connecting sections 8a, 8b can also each be formed rod-shaped with a main extension direction, for example also as round rods made of an electrical conductor material. In this case, the first applicator 21d and the third applicator 21f together with the two connecting sections 8a, 8b form a frame with a basic shape that is rectangular in the present exemplary embodiment. In other words, the first applicator 21d and the third applicator 21f as well as the two connecting sections 8a, 8b form a frame applicator, which can also be regarded as an outer frame applicator.

Alternatively, the two connecting sections 8a, 8b can also be formed from an electrical insulator material. Thus, the two connecting sections 8a, 8b do not have an applicator function then. They can thus be regarded as external applicators analogously to the applicator unit 2a.

The second applicator 21e, which can be regarded as an inner applicator in analogy to the applicator unit 2b, has two partial applicators 21e', 21e" in the present exemplary embodiment.

By forming the second applicator 21e with two partial applicators 21e', 21e", two edge sections of a treatment region can be applied with electric direct current, while a center section of the treatment region located between the two edge sections is not treated.

Further, the fact that in the present exemplary embodiment in particular the second applicator 21e has two partial applicators 21e', 21e" means that the respective distance A3, A4 to the first applicator 21d and to the third applicator 21f can be kept small. Thus, high electrical field strengths between them can be achieved. In order to achieve comparable electrical field strengths with a second applicator 21d without partial applicators 21e', 21e", significantly higher electrical voltages would otherwise be required.

In deviation from the present exemplary embodiment, the second applicator 21e can also be designed as a single applicator.

In the present exemplary embodiment, the first partial applicator 21e' and the second applicator 21e" are connected to one another by two connecting sections 9a, 9b.

The two connecting sections 9a, 9b can also each be formed rod-shaped with a main extension direction, for example also as round rods made of an electrical conductor material. In this case, the first partial applicator 21e' and the second partial applicator 21e" together with the two connecting sections 9a, 9b form a frame with a basic shape that is rectangular in the present exemplary embodiment. In other words, the first partial applicator 21e' and the second partial applicator 21e" as well as the two connecting sections 9a, 9b form a frame applicator, which can also be regarded as an inner frame applicator.

Alternatively, the two connecting sections 9a, 9b can also be formed from an electrical insulator material. Then, the two connecting sections 9a, 9b do not have an applicator function. They can thus be regarded as external applicators analogously to the applicator unit 2a.

In the present exemplary embodiment, a distance A3 between the first applicator 21d and the partial applicator 21e" of the second applicator 21e corresponds to the distance A4 between the third applicator 21f and the partial applicator 21e"' of the second applicator 21e. Thus, the distance A3 and the distance A4 are the same in the present exemplary embodiment.

By assigning the polarities P1, P2 to the respective first applicator 21a, 21d, the second applicator 21b, 21e and the third applicator 21c of the first applicator unit 2a or the second applicator unit 2b in accordance with the present exemplary embodiment, it is ensured that the polarities P1, P2 to a first applicator 21a, 21d, a second applicator 21b, 21e and/or a third applicator 21c of a directly adjacent first applicator unit 2a or second applicator unit 2b of the applicator row 12 are the same. This minimizes potential differences between adjacent applicator units 2a, 2b of the applicator rows 12 and thus arcing.

Figure 4:
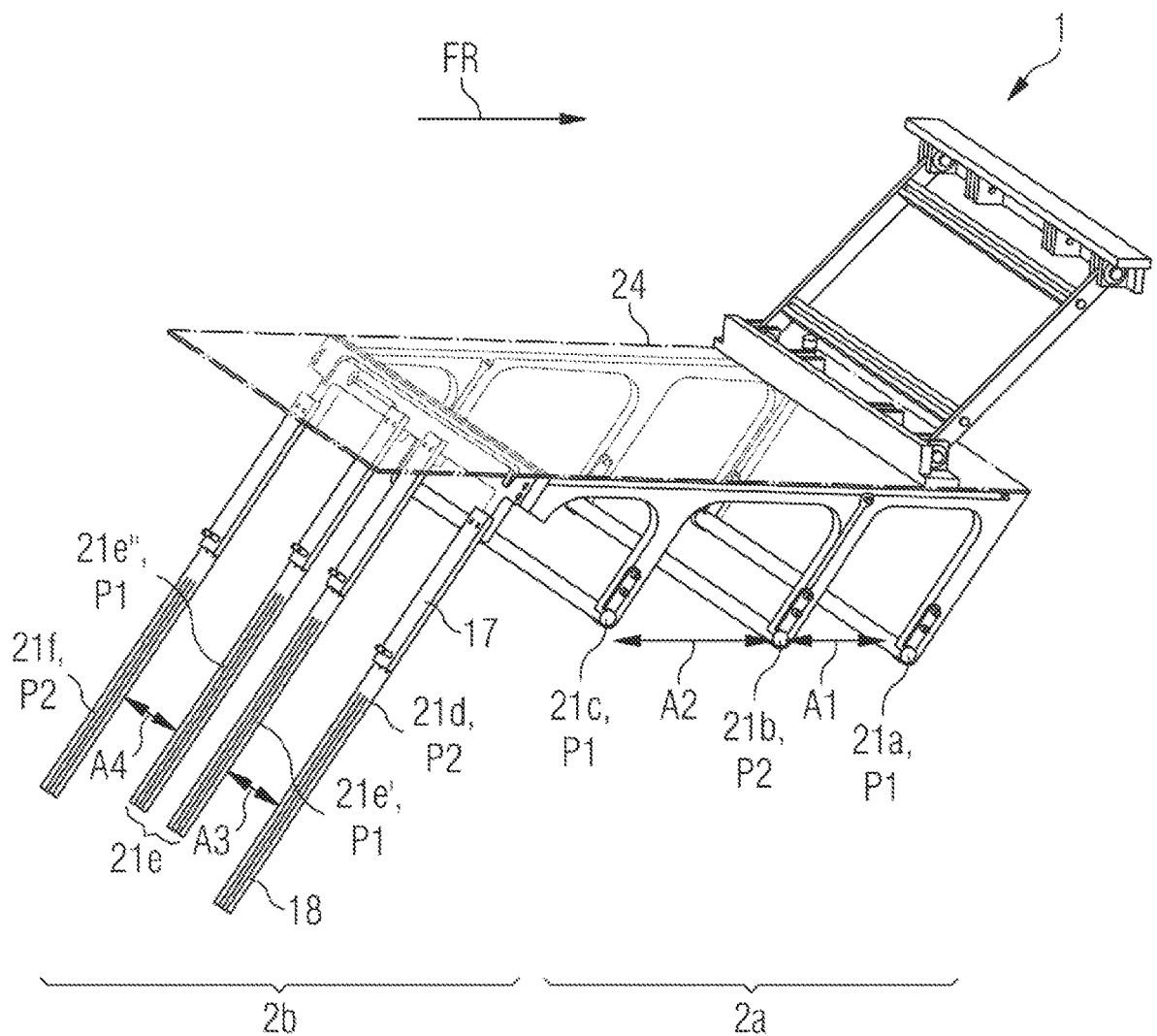
FIG. 4 shows an applicator unit in accordance with a second exemplary embodiment for the device shown in FIGS. 1A and 1B.

Additionally, reference is now made to FIG. 4 to explain further details of the device 1 in accordance with a further exemplary embodiment.

In the present exemplary embodiment, the device 1 also has a first applicator unit 2a and a second applicator unit 2b.

The first applicator unit 2a corresponds to the applicator unit 2a in accordance with the exemplary embodiment shown in FIG. 3.

Like the applicator unit 2a in accordance with the exemplary embodiment shown in FIG. 3, the second applicator unit 2b also has a first in particular substantially stationarily arranged applicator 21d, a second in particular substantially stationarily arranged applicator 21e, and a third in particular substantially stationarily arranged applicator 21f, wherein the second applicator 21e, which can be regarded as an inner applicator in analogy to the applicator unit 2a, has two partial applicators 21e', 21e" in the present exemplary embodiment.

In the present exemplary embodiment, the first applicator 21d, the two partial applicators 21e', 21e" of the second applicator 21e and the third applicator 21f in this case each have a connection section 17 and an electrode section 18 made of an electrical conductor material with a free distal end. The respective connecting sections 17 and/or electrode sections 18 can be designed more flexibly than, for example, the applicators 21a, 21b, 21c of the first applicator unit 2a, i.e., they can possibly deform reversibly in the case of a soil and/or plant contact.

In the present exemplary embodiment, the first applicator 21d and the third applicator 21f are designed longer than the two partial applicators 21e', 21e" of the second applicator 21e. Thus, the first applicator 21d and the third applicator 21f can dip into depressions in the soil on either side of a plant and contact plant stems and/or leaves of the plant located there, as will be explained in detail later.

Figure 5:
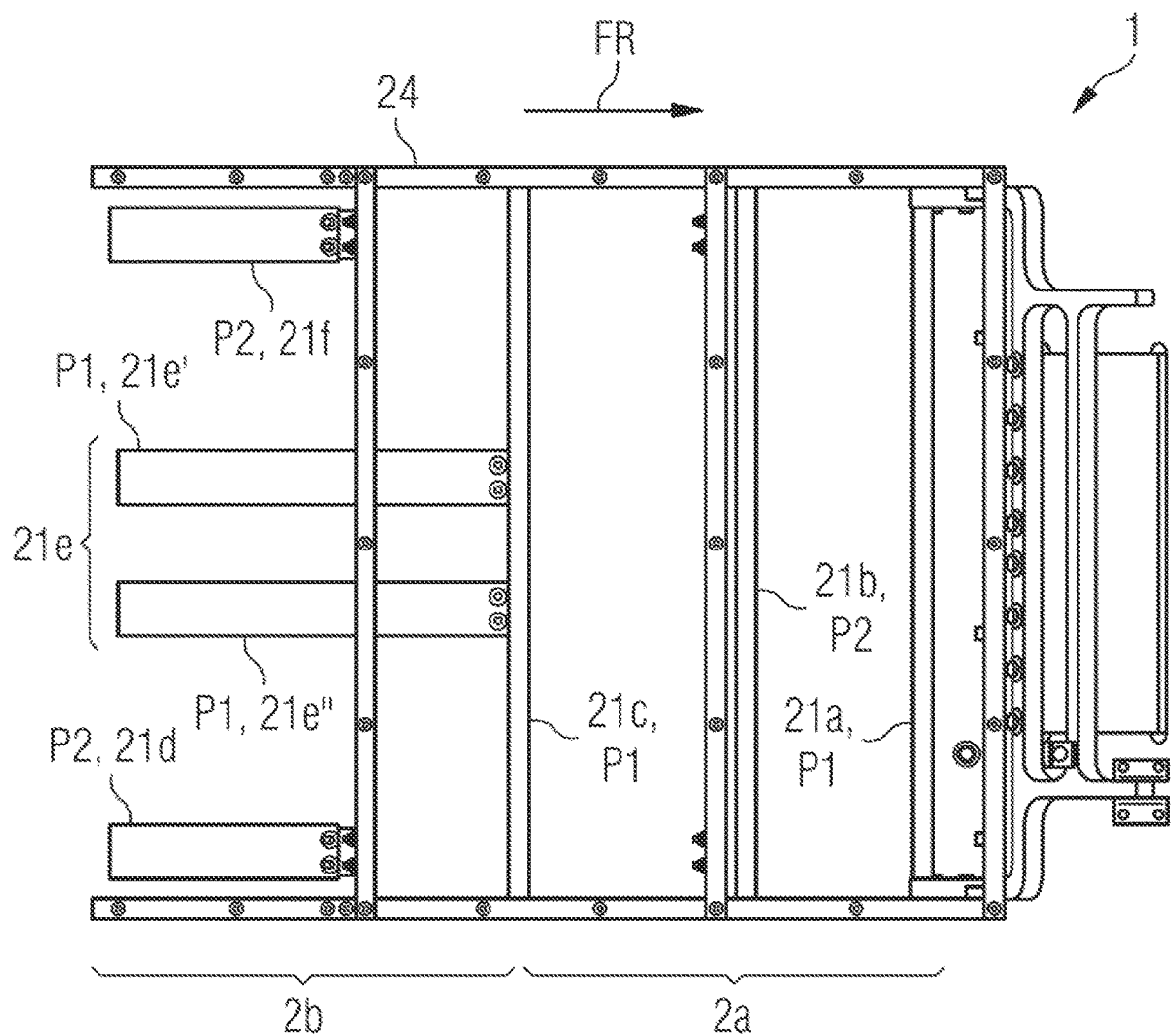
FIG. 5 shows an applicator unit in accordance with a third exemplary embodiment for the device shown in FIGS. 1A and 1B.

Additionally, reference is now made to FIG. 5.

In the present exemplary embodiment, the device 1 also has a first applicator unit 2a and a second applicator unit 2b.

The first applicator unit 2a corresponds to the applicator unit 2a in accordance with the exemplary embodiments shown in FIGS. 3 and 4.

Like the applicator unit 2a in accordance with the exemplary embodiment shown in FIGS. 3 and 4, the second applicator unit 2b also has a first in particular substantially stationarily arranged applicator 21d, a second in particular substantially stationarily arranged applicator 21e, and a third in particular substantially stationarily arranged applicator 21f, wherein the second applicator 21e, which can be regarded as an inner applicator in analogy to the applicator unit 2a, has two partial applicators 21e', 21e" in the present exemplary embodiment.

Deviating from the previous exemplary embodiments, in the present exemplary embodiment the second applicator 21*e* with the two partial applicators 21*e*', 21*e*" of the second applicator unit 2*b* is mechanically and also electrically conductively connected directly, e.g., with a clamp, to the third applicator 21*c* of the first applicator unit 2*a*.

Thus, the two partial applicators 21*e*', 21*e*" of the second applicator 21*e* of the second applicator unit 2*b* have the same polarity P1 as the third applicator 21*c* of the first applicator unit 2*a*. In contrast, the first applicator 21*d* and the third applicator 21*f* have the other polarity P2.

Further, it can be seen that the first applicator 21*d*, the second applicator 21*e* with the two partial applicators 21*e*', 21*e*" and the third applicator 21*f* are arranged end-to-end at the same height.

Figure 6:
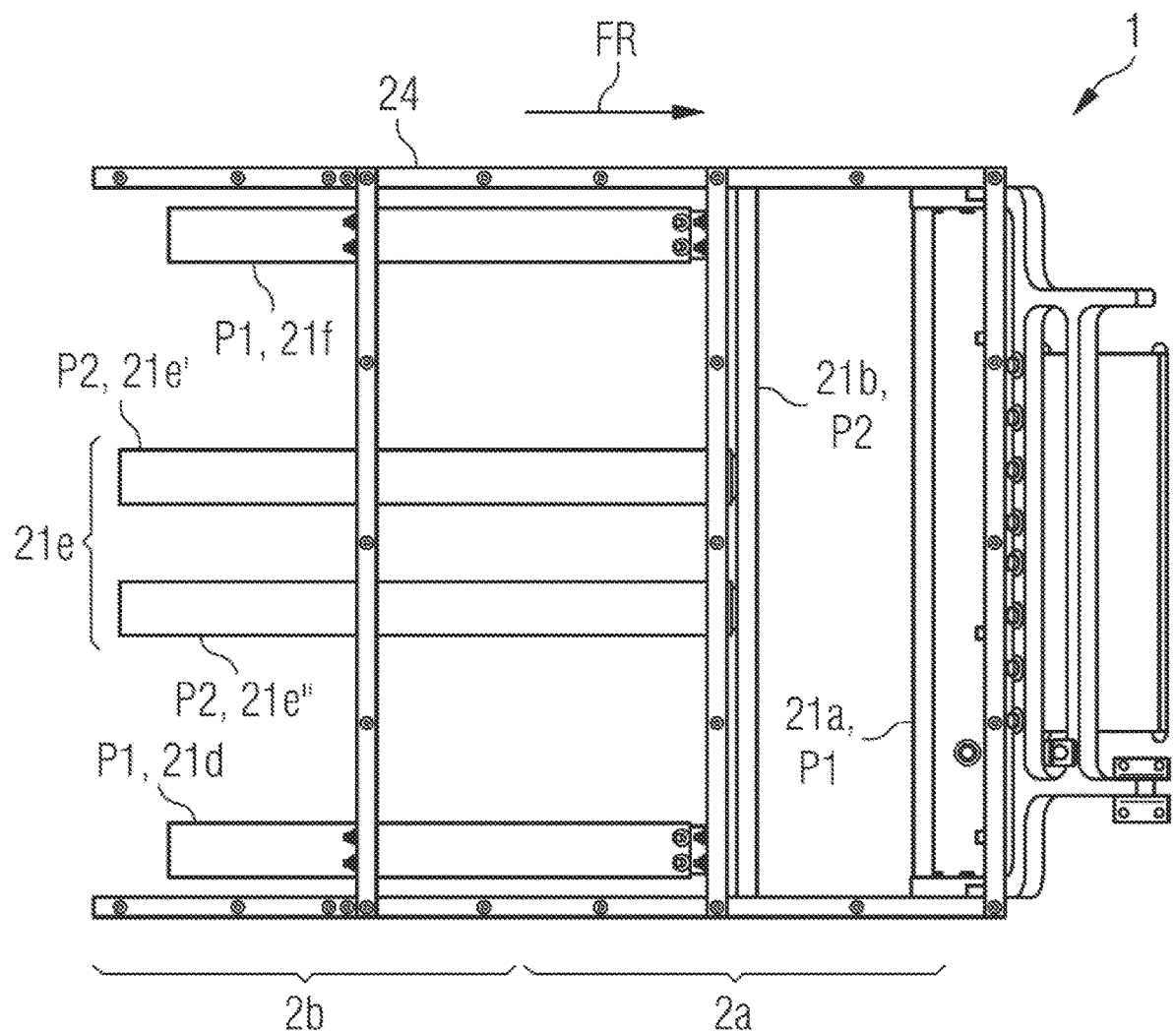
FIG. 6 shows an applicator unit in accordance with a fourth exemplary embodiment for the device shown in FIGS. 1A and 1B.

Additionally, reference is now made to FIG. 6.

In the present exemplary embodiment, the device 1 also has a first applicator unit 2*a* and a second applicator unit 2*b*.

The first applicator unit 2*a* corresponds to the applicator unit 2*a* in accordance with the exemplary embodiments shown in FIGS. 3 and 4 as well as 5, except for the fact that the first applicator unit 2*a* has only a first applicator 21*a* and a second applicator 21*b*.

This first applicator unit 2*a* was formed, for example, by simple disassembly of the third applicator 21*c*. In other words, the device 1 can be modified by mounting and removing individual applicators 21*a*, 21*b*, 21*c*, 21*d*, 21*e*, 21*f*. For example, in the present exemplary embodiment, a modification for a second treatment of plants 40 in the context of a desiccation was carried out, in which, in particular, the second applicator unit 2*b* is to be used to apply an electrical direct current to the plants 40 again and/or to previously untreated plants 40.

Like the applicator unit 2*a* in accordance with the exemplary embodiment shown in FIGS. 3 and 4 as well as 5, the second applicator unit 2*b* also has a first in particular substantially stationarily arranged applicator 21*d*, a second in particular substantially stationarily arranged applicator 21*e*, and a third in particular substantially stationarily arranged applicator 21*f*, wherein the second applicator 21*e*, which can be regarded as an inner applicator in analogy to the applicator unit 2*a*, has two partial applicators 21*e*', 21*e*" in the present exemplary embodiment.

Deviating from the previous exemplary embodiment in accordance with FIG. 5, in the present exemplary embodiment the second applicator 21*e* with the two partial applicators 21*e*', 21*e*" of the second applicator unit 2*b* is mechanically and also electrically conductively connected directly, e.g., with a clamp, to the second applicator 21*b* of the first applicator unit 2*a*.

Thus, the two partial applicators 21*e*', 21*e*" of the second applicator 21*e* of the second applicator unit 2*b* have the same polarity P2 as the second applicator 21*b* of the first applicator unit 2*a*. In contrast, the first applicator 21*d* and the third applicator 21*f* have the other polarity P1.

Further, it can be seen that the second applicator 21*e* with the two partial applicators 21*e*', 21*e*" is formed longer than the first applicator 21*d* and the third applicator 21*f*.

Figure 7:
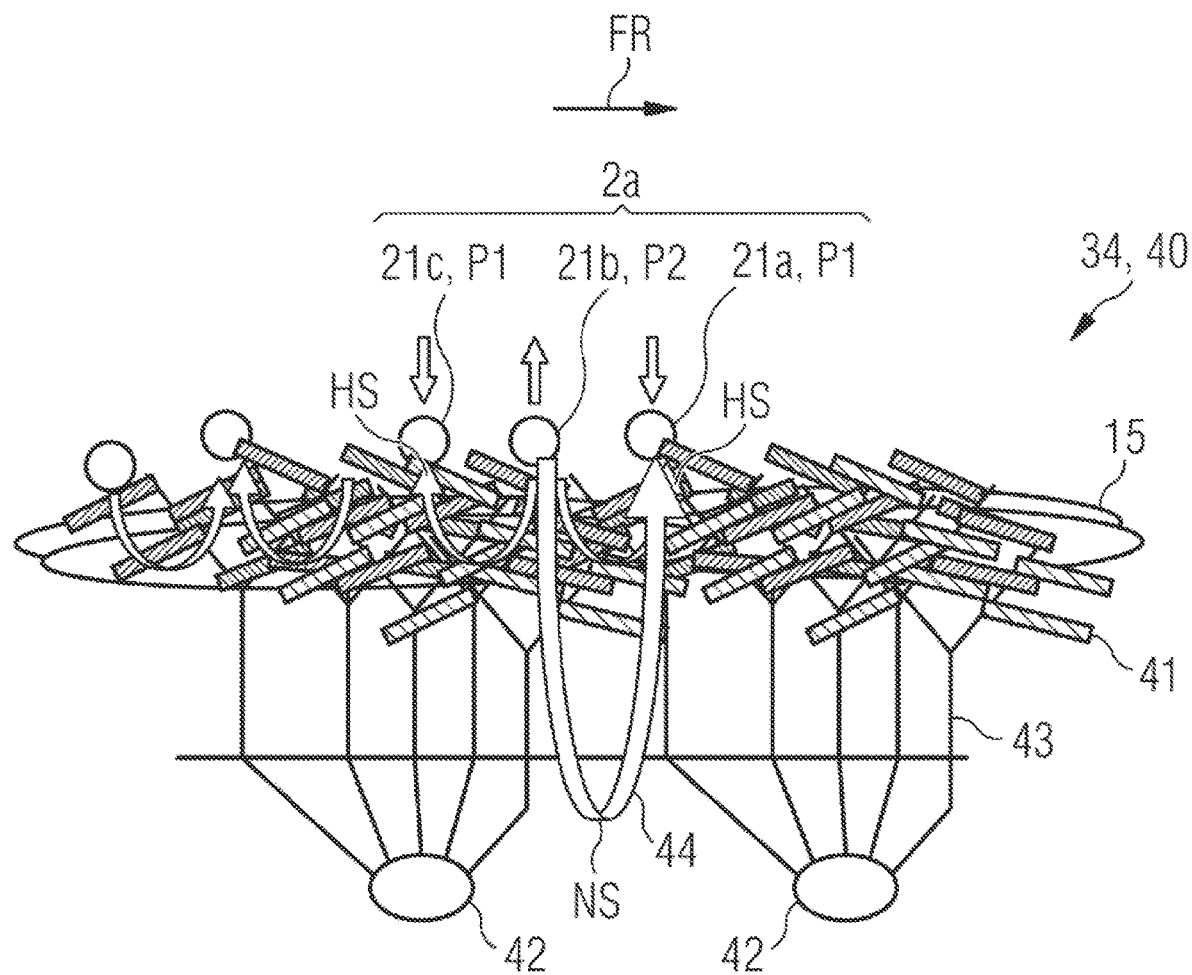
FIG. 7 shows one of the applicator units shown in FIG. 3 during operation.

Additionally, reference is now made to FIG. 7, in order to explain the operation of the device 1 with the first applicator unit 2*a* in which a desiccation of plants 40 is to be effected. The plants 40 may be, for example, tuber vegetables with a plant tuber in the soil 44, such as sweet potato, manioc, yams, yacón, carrot, radish, as well as horseradish, black salsify, various forms of turnip, parsnip, root parsley, turnip, beetroot, small radish, chervil, celeriac, kohlrabi or Japanese artichoke. In the present exemplary embodiment, the plants 40 are potato plants.

In operation, the first applicator 21*a* has a first polarity P1, in the present exemplary embodiment a positive polarity, the second applicator 21*b* has a second polarity P2, in the present exemplary embodiment a negative polarity, and the third applicator 21*c* has the first polarity P1 due to the electrical connection to the constant-power source 3, which leads to the physical current directions indicated by the arrows. As a result of this choice of polarities P1, P2, arcing between the first applicator 21*a* and the second applicator 21*b* can be reduced.

The first applicator 21*a*, the second applicator 21*b* and the third applicator 21*c* can be supplied with the electrical DC voltage in the range of 1,600V to 5,500V. In the present exemplary embodiment, the first applicator 21*a*, the second applicator 21*b* and the third applicator 21*c* are supplied with an electrical DC voltage in a range of 1,600V to 5,500V.

Between the first applicator 21*a* and the second applicator 21*b*, as well as between the second applicator 21*b* and the third applicator 21*c*, there is an electrical field strength, the value of which can be in the range of 1066.6 V/m (=1600V/1.5 m) to 36.666 V/m (=5500V/0.15 m). In the present exemplary embodiment, an electrical field strength is established, the value of which is in the range of 10,000 V/m (=2,000V/0.20 m) to 33.333 V/m (=5,000V/0.15 m). Further, both electrical field strengths are oriented opposite to one another.

The device 1 is now moved in the direction of movement FR over a field 34 with the plants 40, for example at speeds in the range from 2 km/h to 6 km/h. In this case, the device 1 with the first applicator unit 2*a* moves at a low height above the ground 44. In this manner it is to be ensured that there is no ground contact of one of the applicators 21*a*, 21*b*, 21*c* with the ground 44.

In operation, the first applicator 21*a* and the second applicator 21*b* as well as the third applicator 21*c* are thus brought into contact with a plant stem 43 and/or leaves 41 of the plant 40, in particular without ground contact, and thus the contacted plant stem 43 and/or leaves 41 of the plant 40 are applied with electrical direct current, wherein the constant-power source 3 provides a substantially constant electric power.

In other words, a main current component HS is established, the current path of which does not lead through the ground 44 but only through the plant stem 43 and/or leaves 41 of the plant 40. However, in the case of a ground contact, secondary current components NS can occur, the current path of which leads in sections through the ground 44. In this case, the main current component HS accounts for at least half of the total electrical current flowing between two of the three applicators 21*a*, 21*b*, 21*c*. In contrast, when using long applicators, a main current component flows through the ground 44.

Depending on which of the three applicators 21*a*, 21*b*, 21*c* are in contact with the plant stem 43 and/or leaves 41 of the plant 40, the electrical (ohmic) load changes due to the movement in the direction of movement FR, wherein the constant-power source 3 provides a substantially constant electrical power.

It should be noted that the statements made here in relation to the applicator unit 2*a* also apply analogously to the second applicator unit 2*b*, i.e., the second applicator unit 2*b* is also moved in the direction of movement FR over the field 34 with plants 40 at a low height above the ground 44 in order to ensure that there is no ground contact of one of the applicators 21*d*, 21*e*, 21*f* with the ground 44.

Figure 8:
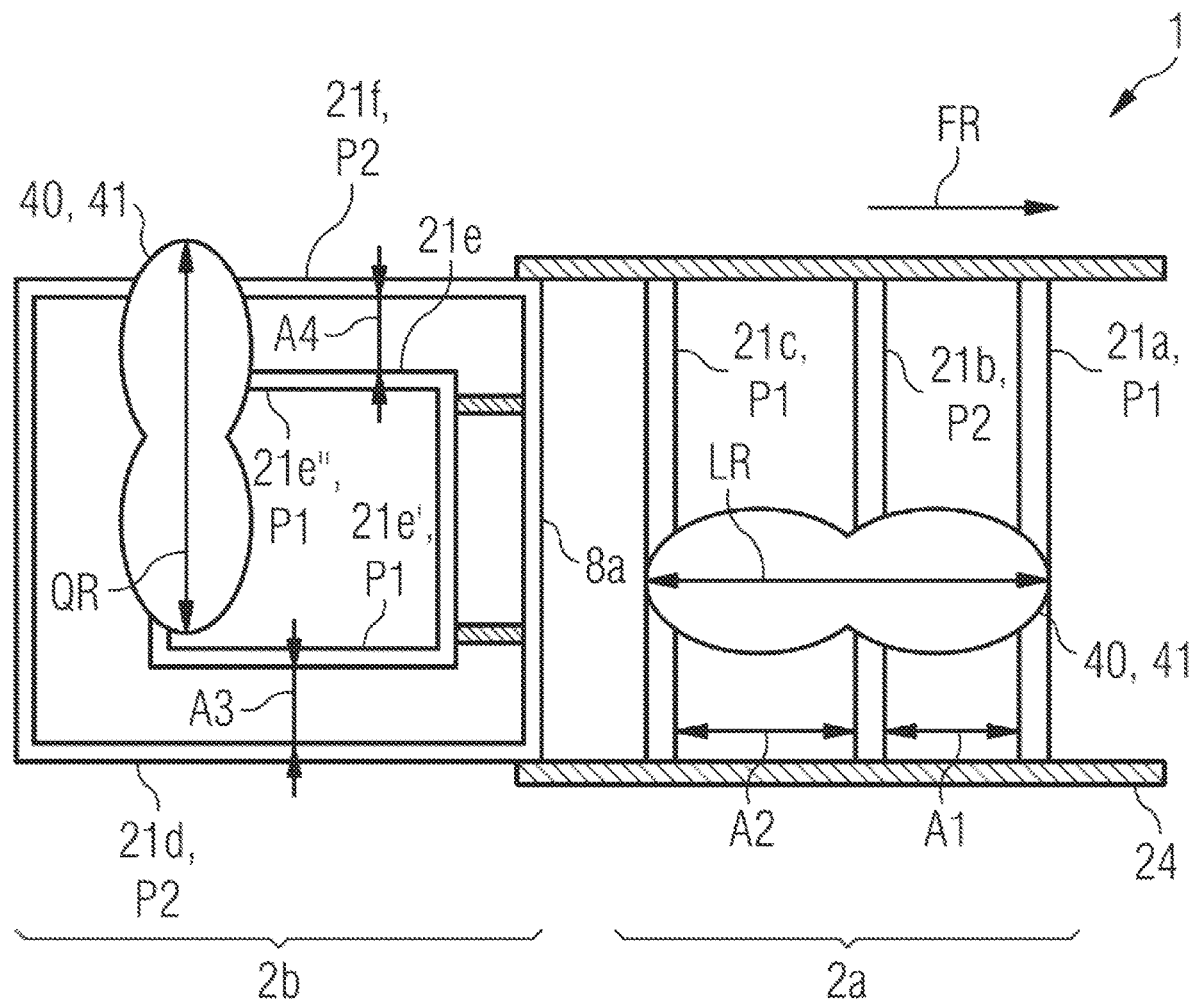
FIG. 8 shows both of the applicator units shown in FIG. 3 during operation.

Additionally, reference is now made to FIG. 8.

It is shown that a plant 40 with its leaves 41 can have a longitudinal extension LR that is greater than the first distance A1 and the second distance A2.

When a plant 40 with its leaves 41 has such a dimension in the direction of movement FR, the first applicator 21*a*, the second applicator 21*b*, and the third applicator 21*c* contact the plant 40 with its leaves 41 simultaneously for a certain period of time while driving over it. In other words, simultaneous multiple contacting occurs.

If, on the other hand, the plant 40 with its leaves 41 does not have such a dimension in the direction of movement FR, the first applicator 21*a* and the second applicator 21*b*, as well as the second applicator 21*b*, and the third applicator 21*c* are in contact with the plant 40 and its leaves 41 in succession when driving over it. But no simultaneous multiple contacting occurs.

Further, a plant 40 with its leaves 41 is shown, which has a transverse extension QR that is greater than the first distance A3 and the second distance A4 of the second applicator unit 2*b*.

If the plant 40 with its leaves 41 has such a dimension transverse to the direction of movement FR, the first applicator 21*a* and the second applicator 21*b*, as well as the second applicator 21*b* and the third applicator 21*c* of the first applicator unit 2*a* do not contact the plant 40 with its leaves 41 while driving over it in such a manner that at least two of the applicators 21*a*, 21*b*, 21*c* contact the plant 40 with its leaves 41 at the same time or simultaneously, and consequently no electrical current flow occurs.

However, in such a case, the first applicator 21*d* and the partial applicator 21*e*' of the second applicator 21*e* and/or the third applicator 21*f* and the partial applicator 21*e*" of the second applicator 21*e* contact the plant 40 with its leaves 41 while driving over it. In comparison to the first applicator unit 2*a*, the use of the second applicator unit 2*b* can lead to longer contact times with the plant stem 43 and/or leaves 41 of the plant 40.

Figure 9:
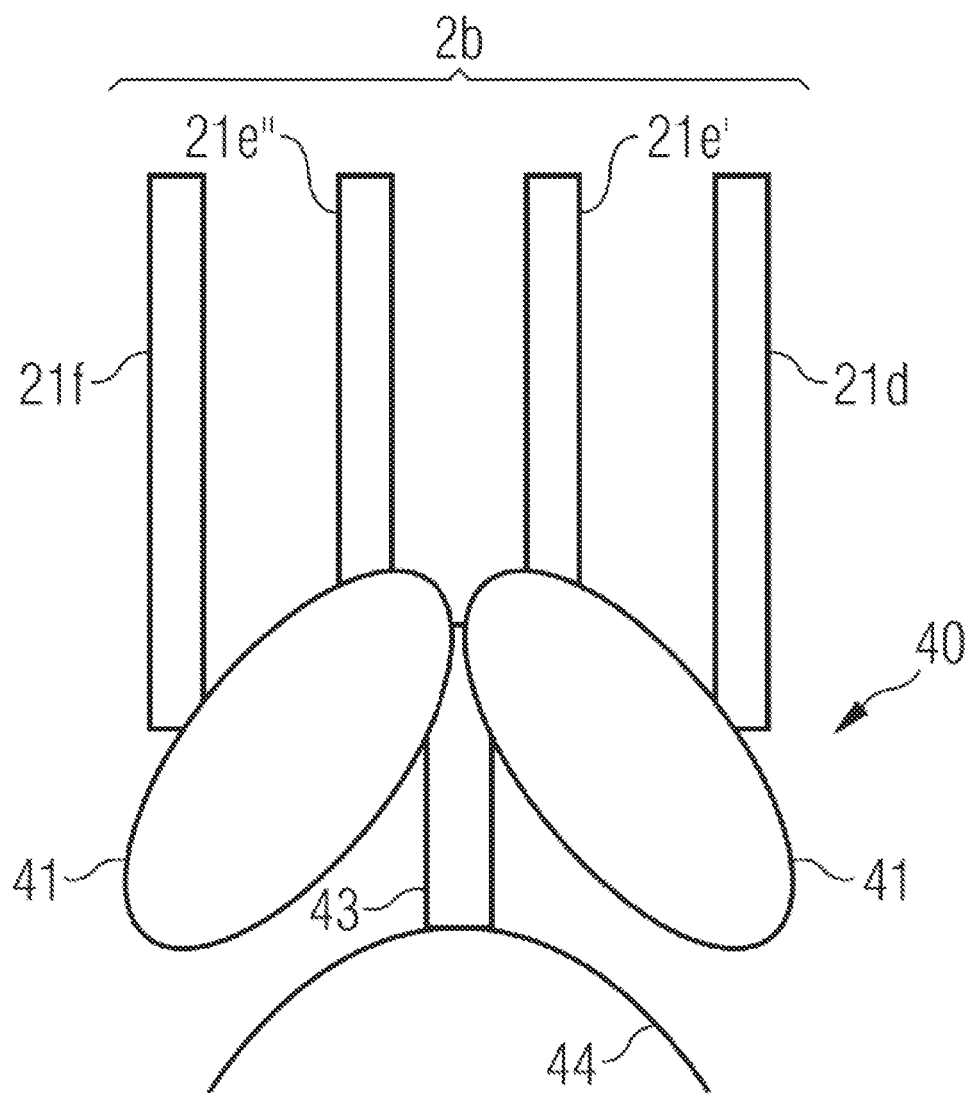
FIG. 9 shows one of the applicator units shown in FIG. 4 during operation.

Additionally, reference is now made to FIG. 9.

A plant 40 with a plant stem 43 and leaves 41 is shown. In the present exemplary embodiment, the plant 40 is a potato plant which is located on an elevation of the soil 44, such as, for example, a potato ridge, wherein the leaves 41 extend at least partially in depressions of the ground 44 next to the elevation. In deviation from the present exemplary embodiment, the plant 40 can also be a different plant, such as, for example, tuber vegetables with a plant tuber in the soil 44, such as sweet potato, manioc, yams, yacón, carrot, radish, as well as horseradish, black salsify, various forms of turnip, parsnip, root parsley, turnip, beetroot, small radish, chervil, celeriac, kohlrabi or Japanese artichoke.

It can be seen that in such a scenario, the applicators 21*d*, 21*f* designed longer in the present embodiment extend down to the depressions of the ground 44 and can also contact the leaves 41 of the plant 40 located there.

Figure 10:
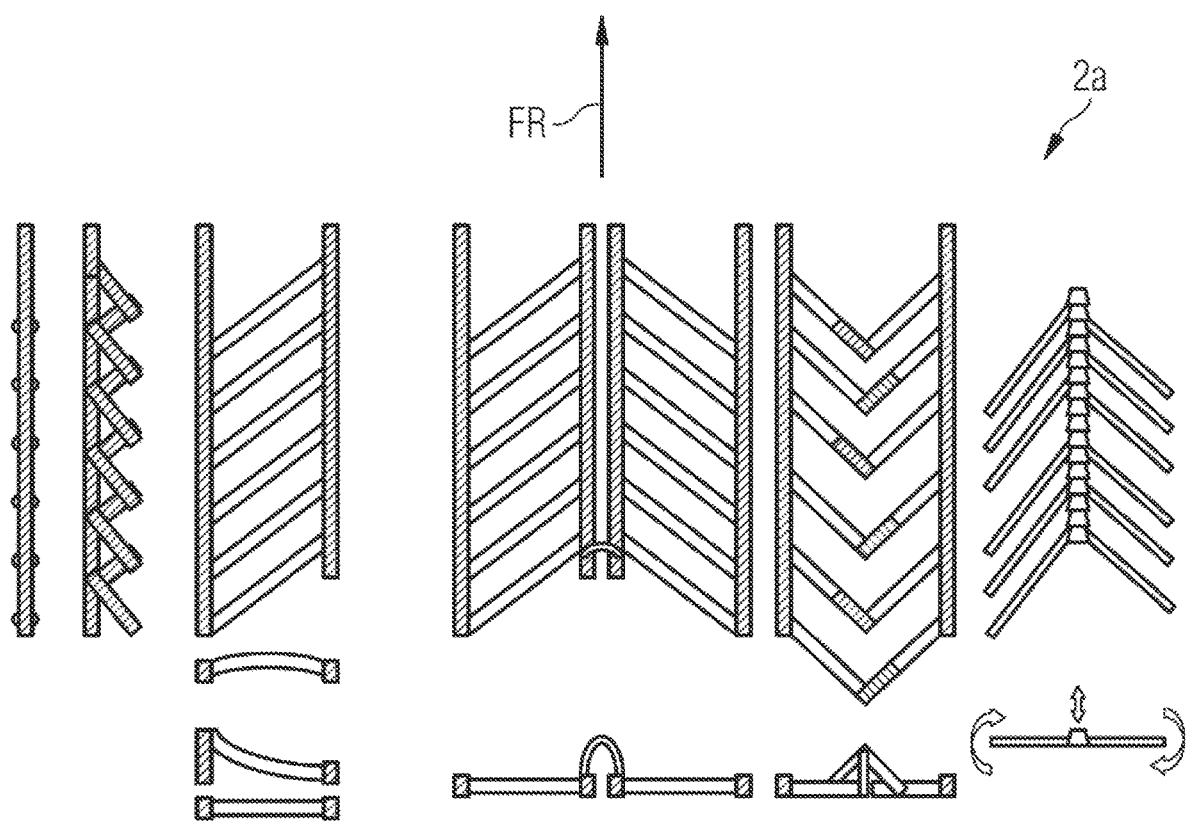
FIG. 10 shows a further exemplary embodiment of the applicator unit shown in FIG. 3.

Additionally, reference is now made to FIG. 10.

Various embodiments of the first applicator unit 2*a* shown in FIG. 3 are depicted.

It is shown that the first applicator 21*a*, the second applicator 21*b* and the third applicator 21*c* and further applicators do not extend with their main extension direction HR in the direction of movement FR and also not transversely to the direction of movement FR, but at an angle of, for example, 45°.

Further, two applicator sections can each be joined at a different angle to one another in the shape of an arrow in order to form the first applicator 21*a*, the second applicator 21*b* and the third applicator 21*c* as well as further applicators. They can form a forward sweep or a backward sweep in the direction of movement FR.

Further, it is shown that the first applicator 21*a*, the second applicator 21*b* and the third applicator 21*c* and further applicators do not have to be formed in a rod-like manner in a straight line, but can also be curved or can also be formed in the shape of a saw tooth.

Figure 11:
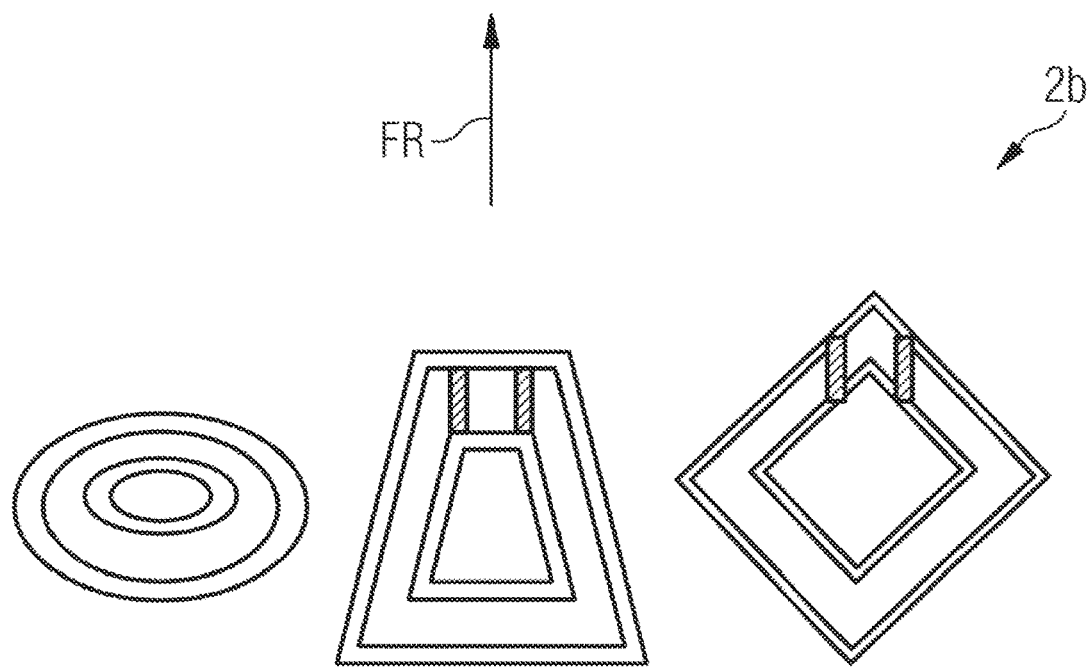
FIG. 11 shows a further exemplary embodiment of the applicator unit shown in FIG. 4.

Additionally, reference is now made to FIG. 11.

Various embodiments of the second applicator unit 2*b* shown in FIG. 3 are depicted.

It is shown that the second applicator unit 2*b* can also have a basic shape deviating from a rectangular basic shape, such as, for example, a circular or elliptical basic shape or also a trapezoidal or other basic shape.

Further, the second applicator unit 2*b* can also be arranged such that the first applicator 21*d*, the second applicator 21*e* with the partial applicators 21*e*', 21*e*" and the third applicator 21*f* do not extend with their main extension direction HR in the direction of movement FR and also not transversely to the direction of movement FR, but at an angle of, for example, 45°.

Figure 12:
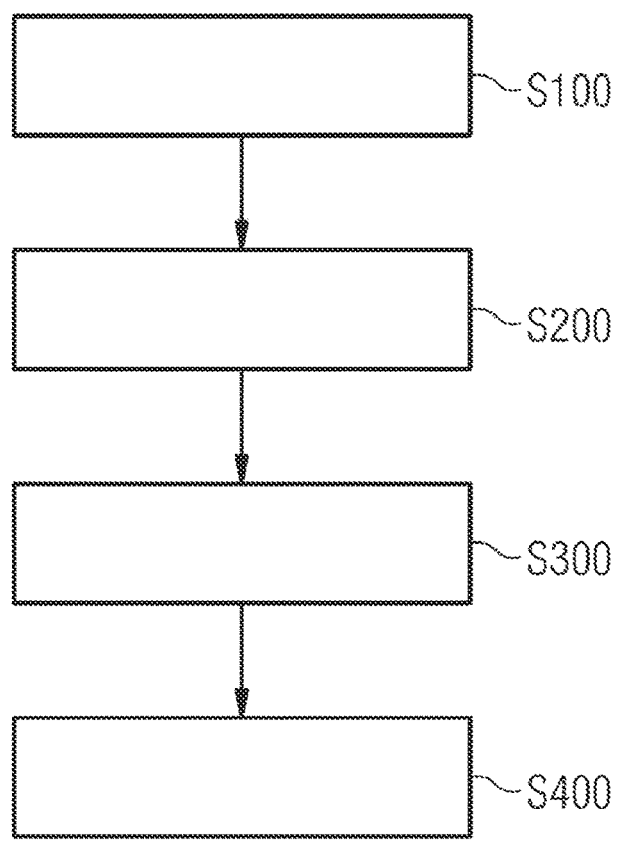
FIG. 12 shows a schematic representation of a process sequence of the method.

Additionally, reference is now made to FIG. 12.

The method for treating plants 40, in particular for the desiccation of crops or for the green manure control, can comprise that a contact resistance-reducing medium 15 is applied to the plant stem 43 and/or leaves 41 of the plant 40.

In a first step S100, the first applicator 21*a* with a first polarity P1, the second applicator 21*b* with a second polarity P2 and the third applicator 21*c* with the first polarity P1 and the first applicator 21*d* with the first polarity P1, the second applicator 21*e*, if necessary with the partial applicators 21*e*', 21*e*", with the second polarity P2 and the third applicator 21*f* with the first polarity P1 are each connected to the controlled constant-power source 3 in a manner transmitting electrical power.

This can be done by closing electrical isolators, e.g., of the transformation and control unit 33.

In a further step S200, the respective first applicator 21*a*, 21*d* and the second applicator 21*b*, 21*e* are brought into contact with the plant stem 43 and/or leaves 41 of the plant 40 and the second applicator 21*b*, 21*e* and the third applicator 21*c*, 21*f* with the plant stem 43 and/or the leaves 41 of the plant 40 in succession and/or simultaneously in such a manner that an electrical direct current occurs, the main current component HS of which does not have a current path which extends in sections through the ground 44.

For this purpose, the device 1 is moved in the direction of movement FR over the field 34 with the plants 40 at a low height above the ground 44, in such a manner that no ground contact of one of the applicators 21*a*, 21*b*, 21*c*, 21*d*, 21*e*, 21*f* with the ground 44 occurs.

In a further step S300, the contacted plant stem 43 and/or the contacted leaves 41 of the plant 40 are now applied with electrical direct current in order to bring about the desiccation.

In a further step S400, the controlled constant-power source 3 maintains a substantially constant electrical power, for example by a combined frequency and pulse width modulation.

As a result of the movement of the device 1 in the direction of movement FR over the field, the applicators 21*a*, 21*b*, 21*c*, 21*d*, 21*e*, 21*f* come into contact with the plant stem 43 and/or the leaves 41 of the plant 40 and lose the contact again. Since the plant stem 43 and/or the leaves 41 of the plant 40 can be regarded as ohmic resistors in an electrical equivalent circuit diagram, the ohmic load of the constant-power source 3 changes suddenly or abruptly. The controlled constant-power source 3 compensates for these load fluctuations during operation.

In the case of, e.g., a desiccation of, e.g., potato plants, a device 1 was used which has a plurality of applicator units 2a, 2b next to one another in the applicator row 12 in order to cover a working width of 6 m. The configuration shown in FIG. 3 with the two applicator units 2a, 2b one after the other was used. The distance between applicators 21a, 21b, 21c, 21d, 21e, 21f was in the range from 0.1 m to 0.2 m.

The device 1 was moved over the field 34 at speeds of 2 km/h to 6 km/h in the direction of movement FR. The following nominal energy inputs per hectare were achieved as a function of the speed in the direction of travel FR: 2 km/h (48 kW/ha), 4 km/h (24 kW/ha), 6 km/h (16 kWh/ha).

While in the case of dry treatment and the use of known applicators, such as long applicators (LRA), at least 128 kWh/ha are needed in order to achieve a good desiccation result, in the case of an initial treatment when using the applicator units 2a, 2b in accordance with this configuration 40-48 kWh/ha are needed with one direction of movement, and in the case of a second treatment in the opposite direction of movement only 32 kWh/h are sufficient in order to achieve good to very good desiccation results.

Further, with desiccation of potato plants, an undesired damage to the potato tubers can be avoided since almost no electrical current flows through the ground 44 and damages the potato tubers. The same also applies to other plants, for example, tuber vegetables with a plant tuber in the soil 44, such as sweet potato, manioc, yams, yacón, carrot, radish, as well as horseradish, black salsify, various forms of turnip, parsnip, root parsley, turnip, beetroot, small radish, chervil, celeriac, kohlrabi or Japanese artichoke.

Further, the effectiveness of the first applicator unit 2a shown in particular in FIG. 6 with only a first applicator 21a and a second applicator 21b in the case of green manure with mustard plants was investigated.

The mustard plants have a distance of 20 cm. They show leaves 41 with a large leaf surface and plant stem 43, which already begin to lignify in the hot summer.

To reduce the contact resistance between the applicators 21a, 21b and the mustard plants, a mixture of 0.45 L Hasten (spray additive to improve the effectiveness of plant protection products) per hectare was used as an adjuvant in combination with 1.5 kg magnesium sulphate per hectare at a water application rate of 250 L water per hectare. The driving speed was 4 km/h.

In the experiment, the following applicator configurations of type BS60, BB60, BB30 and RR30 with a front applicator or front pole and a rear applicator or rear pole were tested in parallel during one pass in comparison with a currentless control K.

An overview of the used applicator configurations of type BS60, BB60, BB30 and RR30 is given in the following table 1.

TABLE 1

| Type | Front pole | Rear pole | Pole distance |
|---|---|---|---|
| BS60 | Sheet metal lamella | Cutting disk | 60 cm |
| BB60 | Sheet metal lamella | Sheet metal lamella | 60 cm |
| BB30 | Sheet metal lamella | Sheet metal lamella | 30 cm |
| RR30 K | Tube currentless | Tube currentless | 30 cm |

The applicator configurations of type BS60 and BB60 as well as BB30 with sheet metal lamellae made of stainless steel (270 mm long, 8 mm wide) were driven vertically in such a manner that they hardly touched the ground 44 but only had surface contact with the mustard plants and the two poles could just about not come too close to one another even with a pole distance or a distance A1 of 30 cm. Accordingly, the electric current had to flow through the plants 40 into the root 42 and, after passing through the ground, back again via another plant 40 at the other pole.

The double flow through the plant stems 43 and roots 42 allows for a high efficiency to be expected. With a larger applicator distance, a deeper penetration into the ground 44 and thus a higher root destruction is to be expected.

When using the BS60 type applicator configuration with a combination of sheet metal lamella and cutting disc, the cutting disc cuts approximately 2 cm to 5 cm into the ground 44 and thus penetrates the dry topsoil. This additionally reduces the electrical resistance of the ground 44 and therefore leads to a high one-time electrical current flow through the plants 40, which are contacted over a large area by the applicators with sheet metal lamellae.

The RR30 type applicator configuration features two stainless steel tubes with a 20 mm diameter spaced 30 cm apart, attached to a flexible rubber mat that is pulled over the plants 40. As the plants 40 are thereby pushed over, the tube lying transverse to the direction of movement FR runs over the plant cover with a very short contact distance. Penetration of the electrical current into the ground 44 and into the roots 42 is hardly to be expected since the electrical current is either introduced into a plant 40 and exits again through the pole resting on the same plant 40, or the electrical current finds the path of the least electrical resistance between two adjacent plants 40 lying on top of one another, for example through stem and leaf material. This can generally minimize the distance traveled by the electric current, but the small contact surfaces and the risk of mutual plant coverage means that no great effects can be expected. In addition, this geometry precludes electrical current flow through roots 42 and suggests little overall effect.

The RR30 type applicator configuration was originally designed for very small plants 40 having a stalk, such as black grass (2-5 cm), which can move between applicators with metal lamellae.

For the evaluation, a seed row of the plants 40 was harvested in each case at 2 m length, the number of plants 40 was determined and the length of the stalk was measured as a biomass indicator. In cases where the remaining number of plants was very low, harvesting was done over 4 m and the quantity was then calculated down to 2 m.

The results of the evaluation are summarized in Table 2 below.

TABLE 2

| Type | Number of plants per 2 m row | Total stalk length per 2 m row | Mean height |
|---|---|---|---|
| BS60 | 46 | 1,985 cm | 43 cm |
| BB60 | 37 | 1,315 cm | 36 cm |
| BB30 | 39 | 1,085 cm | 28 cm |
| RR30 | 17 | 395 cm | 23 cm |
| K | 45 | 1,734 cm | 39 cm |

It can be seen that the BS60 type applicator configuration with the cutting disk supplies poorer results than the control K. The number of plants 40 corresponded to control K, showing that no plants 40 have been killed. The cutting disk could obviously not generate sufficient electrical flow in the quite dry topsoil. The slightly higher stalk length may be due to the edge position of the treatment, in addition to the very good effect of the RR30 type applicator configuration, which led to a better water and light supply.

Use of the applicator configurations of the BB60 and BB30 type with the sheet metal lamellae resulted in a slight reduction in the number of plants 40. Thus, hardly any plants 40 were killed during the treatment. However, the reduced total stalk lengths show that weakening of the plants 40 also occurred due to the killing of individual stems, but no major effect had occurred on the root 42 of the plant 40.

Only in the treatment with the RR30 type applicator configuration was the number of plants 40 lowered to about 30% of control K. This shows that the effect on the plant stem 43 was so great and so deep that they could no longer sprout or grow further. The reduction of the average height of the plants 40 to about 60% of the control K shows that the plants 40 that were not killed were also at least significantly weakened and restricted in growth.

As an overall result, it can be stated that—contrary to the expectations—the applicator configuration of the RR30 type delivers by far the best results with stalked herbaceous mustard plants despite a small contact surface. This can be attributed to the fact that the high electrical current densities at the contact points in combination with the contact fluid used in all tests have ensured a low overall electrical resistance despite the small contact surface. As a result, many plants 40 could be destroyed to such an extent that further growth was not possible at all, or only very limited and delayed.

The passage of electrical current through the ground 44 and the roots 42 did not play any role for the success in the dry topsoil.

Even though applicator configurations of the type BS60, BB60, BB30 and RR30 with only one front pole and one rear pole were used here, it is assumed that the described results can be transferred analogously to applicator configurations with three or more applicators 21*a*, 21*b*, 21*c*, 21*d*, 21*e*, 21*e'*, 21*e"*, 21*f*.

In other words, the energy efficiency of the method for treating plants, in particular for the desiccation of crops or for the green manure control, is significantly increased.

REFERENCE NUMERALS 1 device
2*a* first applicator unit
2*b* second applicator unit
3 constant-power source
4 connection
5 distribution unit
6 converter assembly
7*a* converter
7*b* converter
7*c* converter
8*a* connection section
8*b* connection section
9*a* connection section
9*b* connection section
10 first module
11 nozzle
12 applicator row
13 first support structure
14 liquid container
15 contact resistance lowering medium
16 sensor
17 connection section
18 electrode section
20 second module
21*a* electrical applicator
21*b* electrical applicator
21*c* electrical applicator
21*d* electrical applicator
21*e* electrical applicator
21*e'* partial applicator
21*e"* partial applicator
21*f* electrical applicator
24 second support structure
25 support wheel
30 carrier vehicle
31 PTO shaft
32 generator
33 transformation and control unit
34 field
40 plant
41 leaf
42 root
43 plant stem
44 ground
A1 distance
A2 distance
A3 distance
A4 distance
FR direction of movement
HR main extension direction
HS main current component
LR longitudinal direction
NS secondary current component
P1 first polarity
P2 second polarity
QR transverse direction
S100 step
S200 step
S300 step
S400 step Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

The invention claimed is:

1. A method for treating plants, comprising:
connecting a first applicator having a first polarity, a second applicator having a second polarity, and a third applicator having the first polarity to a source of electrical direct current, wherein the first applicator is spaced apart from the second applicator at a substantially constant distance;
bringing the first applicator and the second applicator into contact with a plant;
applying the electrical direct current via the first applicator and the second applicator to the plant;
bringing the second applicator and the third applicator into contact with the plant, wherein the second applicator and the third applicator first contact the plant after the first applicator and the second applicator contact the plant;
applying the electrical direct current via the second applicator and the third applicator to the plant; and
controlling the source of electrical direct current that is connected to the first applicator, the second applicator and the third applicator so as to maintain the electrical direct current at a substantially constant level, wherein the source of electrical direct current is a control circuit that controls the electrical direct current output by the source to provide a constant power, and wherein the source of electrical direct current is controlled to provide an electrical direct current having a residual ripple of 5% to 20%.

2. The method of claim 1, wherein at some point in time the first applicator, the second applicator and the third applicator are all simultaneously in contact with the plant.

3. The method of claim 1, wherein a first applicator unit includes the first applicator, the second applicator and the third applicator, and wherein the first applicator, the second applicator and the third applicator are arranged transversely to a direction of movement of the first applicator unit spaced successively apart from one another.

4. The method of claim 3, further comprising:
connecting a fourth applicator, a fifth applicator, and a sixth applicator to the source of electrical direct current, wherein a second applicator unit includes the fourth applicator, the fifth applicator and the sixth applicator, wherein the fourth applicator, the fifth applicator and the sixth applicator are arranged longitudinally to the direction of movement of the first applicator unit spaced apart from one another.

5. The method of claim 4, wherein the electrical direct current is applied via the first applicator unit to the plant for a first period of time, wherein the electrical direct current is applied via the second applicator unit to the plant for a second period of time, wherein the second period of time is longer than the first period of time when the plant extends substantially transversely to the direction of movement of the first applicator unit, and wherein the second period of time is shorter than the first period of time when the plant extends substantially longitudinally along the direction of movement of the first applicator unit.

6. The method of claim 3, wherein the substantially constant distance varies by no more than 10% as the first applicator unit moves in the direction of movement of the first applicator unit.

7. The method of claim 1, further comprising:
generating a first electric field between the first applicator and the second applicator by connecting the first applicator and the second applicator to the source of electrical direct current; and
generating a second electric field between the second applicator and the third applicator by connecting the second applicator and the third applicator to the source of electrical direct current, wherein the first electric field has a magnitude that is larger than that of the second electric field.

8. The method of claim 1, further comprising:
generating a first electric field between the first applicator and the second applicator by connecting the first applicator and the second applicator to the source of electrical direct current; and
generating a second electric field between the second applicator and the third applicator by connecting the second applicator and the third applicator to the source of electrical direct current; and
controlling the electrical direct current such that the first electric field has a magnitude that is equal to that of the second electric field when the first applicator, the second applicator and the third applicator simultaneously contact the plant.

9. The method of claim 1, wherein the first applicator and the second applicator are brought into contact with a stem of the plant and with a leaf of the plant.

10. The method of claim 1, wherein the first applicator and the second applicator are brought into contact with the plant without allowing the first applicator or the second applicator to contact the ground.

11. A device for treating plants, comprising:
a source of electrical direct current, wherein the source of electrical direct current is configured so as to output the electrical direct current at a substantially constant power, and wherein the source of electrical direct current is controlled to provide an electrical direct current having a residual ripple of 5% to 20%; and
a first applicator unit that includes a first applicator, a second applicator and a third applicator, wherein the first applicator, the second applicator and the third applicator are connected to the source of electrical direct current, wherein the first applicator has a first polarity, the second applicator has a second polarity, and the third applicator has the first polarity, wherein the first applicator unit is configured such that the first applicator and the second applicator can be brought into contact with a plant without allowing the first applicator or the second applicator to contact the ground as the first applicator unit moves in a direction of movement of the first applicator unit, wherein the first applicator unit is configured such that the electrical direct current can be applied via the first applicator and the second applicator to the plant, wherein the first applicator remains spaced apart from the second applicator at a substantially constant distance as the first applicator unit moves in the direction of movement, and wherein the source of electrical direct current is configured so as to maintain the electrical direct current at a substantially constant level as the electrical direct current is applied via the first applicator and the second applicator to the plant.

12. The device of claim 11, wherein the first applicator unit is configured such that the second applicator and the third applicator can be brought into contact with the plant without allowing the second applicator or the third applicator to contact the ground as the first applicator unit moves in the direction of movement, wherein the first applicator unit is configured such that the electrical direct current can be applied via the second applicator and the third applicator to the plant, wherein the second applicator remains spaced apart from the third applicator at a substantially constant distance as the first applicator unit moves in the direction of movement, and wherein the source of electrical direct current is configured so as to maintain the electrical direct current at a substantially constant level as the electrical direct current is applied via the second applicator and the third applicator to the plant.

13. The device of claim 11, wherein the first applicator, the second applicator and the third applicator are arranged successively apart from one another in the direction of movement.

14. The device of claim 11, further comprising:
a second applicator unit that includes a fourth applicator, a fifth applicator, and a sixth applicator, wherein the fourth applicator, the fifth applicator and the sixth applicator are connected to the source of electrical direct current, wherein the fourth applicator has the first polarity, the fifth applicator has the second polarity, and the sixth applicator has the first polarity, wherein the second applicator unit is configured such that the fourth applicator and the fifth applicator can be brought into contact with the plant as the first applicator unit moves in the direction of movement, wherein the second applicator unit is configured such that the electrical direct current can be applied via the fourth applicator and the fifth applicator to the plant, and wherein the source of electrical direct current is configured so as to maintain the electrical direct current at a substantially constant level as the electrical direct current is applied via the fourth applicator and the fifth applicator to the plant.

15. The device of claim 14, wherein the fourth applicator, the fifth applicator and the sixth applicator are arranged spaced apart from one another transversely to the direction of movement.

16. The device of claim 14, wherein the first applicator unit is configured to apply the electrical direct current to the plant for a first period of time, wherein the second applicator unit is configured to apply the electrical direct current to the plant for a second period of time, wherein the second period of time is longer than the first period of time when the plant extends substantially transversely to the direction of movement, and wherein the second period of time is shorter than the first period of time when the plant extends substantially longitudinally along the direction of movement.

17. The device of claim 11, wherein the source of electrical direct current is configured to generate a first electric field between the first applicator and the second applicator when the first applicator and the second applicator are connected to the source of electrical direct current, wherein the source of electrical direct current is configured to generate a second electric field between the second applicator and the third applicator when the second applicator and the third applicator are connected to the source of electrical direct current, and wherein the first electric field has a magnitude that is larger than that of the second electric field.

18. The device of claim 11, wherein a first electric field is generated between the first applicator and the second applicator when the first applicator and the second applicator are connected to the source of electrical direct current, wherein a second electric field is generated between the second applicator and the third applicator when the second applicator and the third applicator are connected to the source of electrical direct current, and wherein the source of electrical direct current is configured to control the electrical direct current such that the first electric field has a magnitude that is equal to that of the second electric field when the first applicator, the second applicator and the third applicator simultaneously contact the plant.

19. The device of claim 11, wherein each of the first applicator, the second applicator and the third applicator has a continuous outer surface.

* * * * *